United States Patent
Chang et al.

(10) Patent No.: US 9,464,737 B2
(45) Date of Patent: Oct. 11, 2016

(54) ECO-FRIENDLY HIGH PRESSURE HOSE FABRIC AND ECO-FRIENDLY HIGH PRESSURE HOSE USING THE SAME

(75) Inventors: Kyu-Hee Chang, Seoul (KR); Dong Ho Chang, Seongnam (KR)

(73) Assignee: Fabinno Co., Ltd., Seoul (KR)

( * ) Notice: Subject to any disclaimer, the term of this patent is extended or adjusted under 35 U.S.C. 154(b) by 446 days.

(21) Appl. No.: 14/234,295

(22) PCT Filed: Jul. 20, 2012

(86) PCT No.: PCT/KR2012/005802
§ 371 (c)(1),
(2), (4) Date: Jan. 22, 2014

(87) PCT Pub. No.: WO2013/015570
PCT Pub. Date: Jan. 31, 2013

(65) Prior Publication Data
US 2014/0158246 A1    Jun. 12, 2014

(30) Foreign Application Priority Data

Jul. 22, 2011  (KR) .......................... 10-2011-0073114
Jul. 16, 2012  (KR) .......................... 10-2012-0077003

(51) Int. Cl.
*F16L 11/02*   (2006.01)
*F16L 11/04*   (2006.01)
(Continued)

(52) U.S. Cl.
CPC .................. *F16L 11/02* (2013.01); *B32B 1/08* (2013.01); *B32B 3/02* (2013.01); *B32B 3/04* (2013.01);
(Continued)

(58) Field of Classification Search
CPC ......... F16L 11/02; F16L 11/042; B32B 7/12; B32B 25/14; B32B 27/12; B32B 27/302; B32B 27/306; B32B 27/308; B32B 27/32; B32B 1/08; B32B 3/02; B32B 3/04; B32B 3/06; B32B 2250/44; B32B 2262/0253; B32B 2410/00; B32B 2597/00; B32B 2321/022; D03D 15/00; Y10T 428/2476
See application file for complete search history.

(56) References Cited

U.S. PATENT DOCUMENTS

2007/0194482 A1   8/2007  Douglas et al.
2008/0072984 A1   3/2008  Branch et al.

FOREIGN PATENT DOCUMENTS

EP    2735442 A2    5/2014
JP    2000-318108 A   11/2000
(Continued)

OTHER PUBLICATIONS

Machine English translation of JP 2002106756 (Apr. 10, 2002) originally cited by applicant.*

(Continued)

*Primary Examiner* — Michael C Miggins
(74) *Attorney, Agent, or Firm* — Nutter McClennen & Fish LLP; John J. Penny, Jr.

(57) ABSTRACT

Proposed are an eco-friendly high pressure hose fabric and an eco-friendly high pressure hose using the same. The eco-friendly high pressure hose fabric includes a textile woven from a polypropylene-based fiber, a first coating layer formed on one surface of the textile, a second coating layer formed on the other surface of the textile to extend longer than the length of the textile, a resin adhesive layer formed over the entirety of the top surface of the first coating layer and the top surface of the second coating layer extending longer than the length of the textile, and a film layer formed on the top surface of the resin adhesive layer to correspond to the length of the second coating layer. Ends of the second coating layer, the resin adhesive layer and the film layer, which extend longer than the length of the textile and are stacked on one another, form an extended portion of the fabric.

9 Claims, 1 Drawing Sheet

(51) Int. Cl.
*B32B 7/12* (2006.01)
*B32B 25/14* (2006.01)
*B32B 27/12* (2006.01)
*B32B 27/30* (2006.01)
*B32B 27/32* (2006.01)
*B32B 1/08* (2006.01)
*B32B 3/02* (2006.01)
*B32B 3/04* (2006.01)
*B32B 3/06* (2006.01)
*D03D 15/00* (2006.01)

(52) U.S. Cl.
CPC . *B32B 3/06* (2013.01); *B32B 7/12* (2013.01); *B32B 25/14* (2013.01); *B32B 27/12* (2013.01); *B32B 27/302* (2013.01); *B32B 27/306* (2013.01); *B32B 27/308* (2013.01); *B32B 27/32* (2013.01); *D03D 15/00* (2013.01); *F16L 11/042* (2013.01); *B32B 2250/44* (2013.01); *B32B 2262/0253* (2013.01); *B32B 2410/00* (2013.01); *B32B 2597/00* (2013.01); *D10B 2321/022* (2013.01); *Y10T 428/2476* (2015.01)

(56) References Cited

FOREIGN PATENT DOCUMENTS

| | | |
|---|---|---|
| JP | 2001-289370 A | 10/2001 |
| JP | 2002-106756 A | 4/2002 |
| KR | 20-0282815 Y1 | 7/2002 |
| KR | 10-2002-0069337 A | 8/2002 |
| KR | 10-2003-0029177 A | 4/2003 |
| KR | 10-2007-0092528 A | 9/2007 |
| WO | 03/083342 A1 | 10/2003 |
| WO | 2007/127274 A1 | 11/2007 |

OTHER PUBLICATIONS

Machine English translation of KR 1020030029177 (Apr. 14, 2003) originally cited by applicant.*
International Search Report for Application No. PCT/KR2012/005802 mailed Jan. 30, 2013 (4 Pages).

* cited by examiner

ECO-FRIENDLY HIGH PRESSURE HOSE FABRIC AND ECO-FRIENDLY HIGH PRESSURE HOSE USING THE SAME

TECHNICAL FIELD

The present disclosure relates to an eco-friendly high pressure hose fabric and an eco-friendly high pressure hose using the same, and more particularly, to an eco-friendly high pressure hose fabric which may be effectively used for spurting high pressure liquid or gas and which may also be made of recyclable material, and an eco-friendly high pressure hose using the same.

BACKGROUND ART

In the past, polyvinyl chloride (PVC) hoses have been frequently used as a high pressure hose in the agriculture industry. A PVC hose forms a circular section by applying a PVC liquid to an outer side of a yarn, which prevents a mating surface from forming and further prevents water from leaking through a mating surface. A PVC liquid is applied thickly due to strong tensile strength (about 3 kgf/cm$^2$). For reasons that a PVC hose has strong tensile strength and does not cause water to leak, the PVC hose is suitable for a high pressure hose; however, since it is not recyclable and due to pollution caused by incineration, the use of a PVC hose is limited. Therefore, alternative products for a PVC hose are being actively developed.

As alternative PVC hose products, a hose fabricated by rolling a fabric, which is obtained by coating a mixture of PE and EVA on a surface of a colloid made of a petrochemical yarn, to which overlapping portions are then adhered by resin, is being developed. Such a hose prevents water from leaking through the fabric by coating the surface of the fabric, and the mating surface is adhered with a resin to prevent water leak. However, if high pressure is applied to the hose, water leak occurs at the mating surface portion. Therefore, when alternative PVC hose products are developed for the agriculture industry, it is impossible to apply high pressure, which inevitably limits the use.

In particular, the above hose for agriculture has a short life span when it is used under strong ultraviolet rays, for example in tropical regions, or extends a long distance. In addition, due to poor adhesion, if high water pressure is applied, the mating surface may be separated to cause water leak. Therefore, in tropical regions, an agricultural hose made of PVC is generally used.

However, the agricultural hose made of PVC cannot be recycled as described above due to the PVC material, which poses waste problems. In addition, due to the significant thickness and weight of the hose, it is not easy to carry, store or install the hose.

In addition, even though an existing pressure-resisting PVC hose has excellent durability, since a woven layer is generally formed by twisting several cotton yarns, the hose has a very large volume and irregular sections, which results in irregular pressure resistance. Moreover, in the existing pressure-resisting PVC hose, since only both side surfaces of the woven layer are coated and coupled, a coupling force between the layers is too weak to stably maintain the pressure resistance. In addition, if the PVC hose receives an impact due to bending or the like, several cotton yarns configuring the inside of the woven layer may space apart from each other to cause layer separation, which makes it difficult to maintain uniform pressure resistance as a whole.

DISCLOSURE

Technical Problem

Therefore, the present disclosure is directed to providing an eco-friendly high pressure hose fabric which may be effectively used for carrying high pressure liquid or gas and be made of recyclable material, and an eco-friendly high pressure hose using the same.

The present disclosure is also directed to providing an eco-friendly high pressure hose fabric which has excellent properties, for example no water leaking through the fabric even at high pressure, and an eco-friendly high pressure hose using the same.

Technical Solution

In one aspect of the present disclosure, there is provided an eco-friendly high pressure hose fabric, which includes a textile woven from a polypropylene-based fiber; a first coating layer formed on one surface of the textile; a second coating layer formed on the other surface of the textile to extend longer than the length of the textile; a resin adhesive layer formed over the entirety of the top surface of the first coating layer and the top surface of the second coating layer extending longer than the length of the textile; and a film layer formed on the top surface of the resin adhesive layer to correspond to the length of the second coating layer, wherein ends of the second coating layer, the resin adhesive layer and the film layer, which extend longer than the length of the textile and are stacked on one another, form an extended portion of the fabric.

In the present disclosure, the first coating layer, the second coating layer and the resin adhesive layer may be independently made of a polyolefin-based rubber, obtained by dispersing rubber components in a polyolefin-based matrix, or a polyolefin-based complex composition, which is a mixture of a polyolefin rubber and a polyolefin-based resin, and the film layer may be made of a polyolefin-based resin composition.

The polyolefin-based rubber of the present disclosure means a resin having a rubber component formed as a domain in a polyolefin-based resin matrix, and the 'polyolefin-based complex composition' means a mixture composition of the polyolefin-based rubber and the polyolefin-based resin. In addition, the 'polyolefin-based resin composition' means one kind of polyolefin-based resin or a mixture of two or more kinds of polyolefin-based resins.

Further, when the first coating layer, the second coating layer and the resin adhesive layer are all made of a polyolefin-based rubber in which rubber components are dispersed or a polyolefin-based complex composition containing the polyolefin-based rubber, the present disclosure may provide a high pressure hose fabric which is excellent in flexibility, adhesion strength, resistance against high pressure, strength and rigidity.

In particular, when the first coating layer, the second coating layer, the resin adhesive layer and the film layer are all made of a polyolefin-based complex composition, the present disclosure may provide a high pressure hose fabric which is even more excellent in resistance against high pressure, rigidity and flexibility.

In addition, the present disclosure is not limited in the amount of polyolefin-based rubber contained in the polyolefin-based complex composition. For example, the polyolefin-based complex composition may contain 20 to 100 weight % of polyolefin-based rubber and 80 to 0 weight % of polyolefin-based resin. If the polyolefin-based complex composition meets the above composition ratio, it is possible to enhance flexibility and elasticity, improve impact and perforation resistance, endow soft touch feeling, and improve surface tension to endure high pressure more easily, while maintaining good balancing of mechanical properties and low thermal shrinkage. In particular, the polyolefin-based complex composition may preferably contain 30 to 90 weight % of polyolefin-based rubber and 70 to 10 weight % of polyolefin-based resin, more preferably 50 to 85 parts by weight of polyolefin-based rubber and 50 to 15 parts by weight of polyolefin-based resin. If the polyolefin-based complex composition meets the above composition ratio, it is possible to manufacture a fabric which is more excellent in resistance against high pressure, adhesion of each layer and flexibility.

The polyolefin-based rubber of the present disclosure means a resin having a rubber component formed as a domain in a polyolefin-based resin matrix. In other words, the polyolefin-based rubber may be made by dynamically blending a rubber resin such as ethylene-propylene (EPR), ethylene-propylene-diene copolymer (EPDM), ethylene-ethyl acrylonitrile-butadiene copolymer or the like with a polyolefin-based resin. In addition, the polyolefin-based rubber may also be made by polymerizing a polyolefin in a reactor and then polymerizing a rubber such as EPR in another reactor. The polyolefin-based rubber prepared as above may have rubber components of a very small size, which are formed as a domain in a polyolefin matrix. In addition, the polyolefin-based rubber may be made by polymerizing a polyolefin-based resin and a rubber in different reactors, then mixing them, and additionally polymerizing the mixture with an olefin.

In the present disclosure, if the polyolefin-based rubber having rubber components serving as a domain and dispersed with a very small size in a polyolefin matrix by polymerizing with the rubber components in a reactor as described above is used, it is possible to provide a high pressure hose fabric which is more excellent in impact strength, tensile strength and flexibility. This resin may be, for example, Adflex CA60A, produced by Basell.

In the polyolefin-based complex composition of the present disclosure, the polyolefin-based resin mixed with a polyolefin-based rubber is not specially limited as long as propylene and ethylene are contained as main components. The polyolefin resin may be, for example, a polyethylene copolymer or a polypropylene copolymer, which contains polyethylene, polypropylene, ethylene or propylene as a main component, and in more detail may contain 50 to 99.99 weight % of ethylene or propylene and be selected from copolymers of ethylene or propylene and at least one monomer selected from alpha olefin of $C_2$ to $C_{16}$, (meth)acrylic acid, (meth)acrylate, vinyl acetate and styrene, and their mixtures. The copolymer may be, for example, an ethylene-1-butene copolymer, an ethylene-octene copolymer, an ethylene-acrylate copolymer, an ethylene-vinyl acetate copolymer or the like, without being limited thereto. The polyolefin-based resin may be, for example, 270A, FI 150 produced by Honam Petrochemical Corp., Q100F produced by Basell, or the like.

In the high pressure hose fabric of the present disclosure, the textile is not specially limited as long as it is made of a polypropylene-based fiber. For example, if the textile uses a textile woven from a polypropylene-based fiber having a strength of 5 g/De to 9 g/De, it is possible to provide an eco-friendly high pressure hose fabric having excellent properties.

In the present disclosure, the high pressure hose fabric has a waterproofing property at high pressure. If the polyolefin-based complex composition is used, it is possible to obtain an eco-friendly high pressure hose fabric in which an adhesion between the first coating layer and/or second coating layer and the textile is 95 to 105 N/5 cm, based on BS 3424 part 7 method 9, and this coating adhesion may ensure a sufficient waterproofing property.

In the present disclosure, the film layer is not strictly limited as long as it uses the above mixture of at least one kind of polyolefin-based resins, and the film layer may use either a single-layered film or a multi-layered film. In the present disclosure, the film layer may be formed by thermally bonding a prepared film to a resin adhesive layer at high temperature, instead of laminating a resin incited by melt extrusion onto a resin adhesive layer, so that thermal history of the fabric according to the present disclosure decreases to prevent loss of properties caused by degradation.

According to another embodiment, the present disclosure also provides an eco-friendly high pressure hose fabric, which includes a textile woven from a polypropylene-based fiber having a strength of 5 g/De to 9 g/De; a first coating layer formed on one surface of the textile; a second coating layer formed on the other surface of the textile to extend longer than the length of the textile; a resin adhesive layer formed over the entirety of the top surface of the first coating layer and the top surface of the second coating layer extending longer than the length of the textile; and a film layer formed on the top surface of the resin adhesive layer to correspond to the length of the second coating layer, wherein ends of the second coating layer, the resin adhesive layer and the film layer, which extend longer than the length of the textile and are stacked on one another, form an extended portion of the fabric, and wherein the first coating layer and the second coating layer are made of a polyolefin-based rubber or a polyolefin-based complex composition, respectively, and an eco-friendly high pressure hose fabric manufactured using the same.

In addition, according to another embodiment, the present disclosure also provides an eco-friendly high pressure hose fabric, which includes a textile woven from a polypropylene-based fiber having a strength of 5 g/De to 9 g/De; a first coating layer formed on one surface of the textile; a second coating layer formed on the other surface of the textile to extend longer than the length of the textile; a resin adhesive layer formed over the entirety of the top surface of the first coating layer and the top surface of the second coating layer extending longer than the length of the textile; and a film layer formed on the top surface of the resin adhesive layer to correspond to the length of the second coating layer, wherein ends of the second coating layer, the resin adhesive layer and the film layer, which extend longer than the length of the textile and are stacked on one another, form an extended portion of the fabric, and wherein the first coating layer, the second coating layer and the resin adhesive layer are independently made of a polyolefin-based rubber or a polyolefin-based complex composition, respectively, and an eco-friendly high pressure hose fabric manufactured using the same.

Further, according to another embodiment, the present disclosure also provides an eco-friendly high pressure hose fabric, which includes a textile woven from a polypropylene-based fiber having a strength of 5 g/De to 9 g/De; a first coating layer formed on one surface of the textile; a second coating layer formed on the other surface of the textile to extend longer than the length of the textile; a resin adhesive layer formed over the entirety of the top surface of the first coating layer and the top surface of the second coating layer extending longer than the length of the textile; and a film layer formed on the top surface of the resin adhesive layer to correspond to the length of the second coating layer, wherein ends of the second coating layer, the resin adhesive layer and the film layer, which extend longer than the length of the textile and are stacked on one another, form an extended portion of the fabric, and wherein the first coating layer, the second coating layer, the resin adhesive layer and the film layer are independently made of a polyolefin-based rubber or a polyolefin-based complex composition, respectively, and an eco-friendly high pressure hose fabric manufactured using the same.

In addition, according to other embodiments, the present disclosure provides an eco-friendly high pressure hose fabric and an eco-friendly high pressure hose using the same, in which a coating adhesion between the textile and the first and second coating layers are independently 95 to 105 N/5 cm, based on BS 3424 part 7 method 9B.

The thickness of the extended portion may be variously adjusted according to a size of a produced hose. For example, the extended portion may have thickness of 180 to 400 μm. If the thickness of the extended portion is within the above rage, sufficient watertightness may be ensured at high pressure during a pumping process, and economic feasibility may also be ensured.

In the present disclosure, the polypropylene-based fiber forming the polyolefin-based textile may be selected from the group consisting of monofilament, staple, multi filament, slit-film fiber and split-film fiber. The fineness of the polypropylene-based fiber is not specially limited but is, for example, 700 to 3,000 De in view of flexibility and pressure resistance. The density of the textile may variously change according to the pressure applied to the hose. For example, the textile may have a weaving density of 14 to 30 picks per warp inch and 14 to 30 per weft inch.

To describe the textile of the present disclosure in more detail, in the present disclosure, the polypropylene-based fiber forming the textile means a fiber made of fiber-forming polymer polyolefin having a long chain containing at least 85% of olefin monomer such as ethylene, propylene, butene, pentene and hexene. Most crystalline polyolefin has fibrous performance, among which polypropylene and polyethylene are important as fibers.

Since the polypropylene-based fiber is composed of only hydrocarbon, it has a great hydrophobic property due to the absence of polarity. Therefore, the polypropylene-based fiber has low possibility of leak during a pumping process due to a very low absorption rate and also is excellent in resistance against polar contaminants, solvent resistance, chemical resistance, weather resistance or the like. In addition, the polypropylene-based fiber may have strength of 5 g/De to 9 g/De, more preferably 6.5 to 9 g/De. The polypropylene-based fiber may have resistance against fracture even at high pressure, ensure low sense of weight in handling while maintaining durability, have flexibility, and possess strong tensile, tearing and rupture strength.

Therefore, since the eco-friendly high pressure hose fabric according to the present disclosure uses a textile woven from a high-strength polypropylene-based fiber as a substrate, different from the existing technique, even though inner pressure is repeatedly applied during a pumping process, the eco-friendly high pressure hose fabric is not separated as long as the coating layer and the film layer formed on the textile are not broken. The polypropylene-based fiber of the present disclosure is fabricated through a melt spinning process, and depending on detailed fabricating procedures, the polypropylene-based fiber may have a monofilament, staple, multi filament, slit-film fiber, and split-film fiber form. The monofilament may be made by elongating and crimping polyolefin pellets through drying, melting and spinning. The staple may be made through focusing, stretching, crimping and cutting filaments after drying, melting and spinning. The multi filament may be made through winding and elongating/crimping after drying, melting and spinning. The slit-film fiber and the split-film fiber may be made by cutting or slitting a melt-extruded film by using a T-spinneret or made by means of mechanical or mechanochemical fibrillation. The polypropylene-based fiber may have, for example, fineness of 700 to 3,000 De, preferably 850 to 2,500 De, more preferably 1,000 to 2,000 De. The unit 'De' represents thickness of a fiber, and 1 De is obtained when a length of 9,000 m has a weight of 1 g. If the fineness of the polypropylene-based fiber satisfies the above range, problems such as difficulty in handling and an increase in production costs due to excessive thickness of the obtained textile may be prevented, and flexibility may also be added to the textile. In addition, in this case, the polypropylene-based fiber may maintain strength demanded as a substrate of the high pressure hose, allow easy storage and transfer of a produced hose, and ensure higher water pressure.

The textile may have weaving densities of warp and weft, namely a warp density and a weft density, of for example, 14 to 30 pick/inch, preferably 16 to 26 pick/inch, more preferably 18 to 22 pick/inch. If the textile have the above weaving density, uniform thermal shrinkage is ensured during a coating process, and when the fabric is applied to a hose, it is possible to stably maintain pressure resistance, form uniform inner diameter, and ensure excellent properties (tensile, tearing and rupture strength).

Hereinafter, preferred embodiments of the present disclosure will be described in detail with reference to the accompanying drawings. Prior to the description, it should be understood that the terms or words used in the specification should not be construed as limited to general and dictionary meanings, but interpreted based on the meanings and concepts corresponding to technical aspects of the present disclosure on the basis of the principle that the inventor is allowed to define terms appropriately for the best explanation.

FIG. 1 shows a structure of the present disclosure. Referring to FIG. 1, the eco-friendly high pressure hose fabric includes a first coating layer 2 and a second coating layer 3 respectively formed on one surface and the other surface of a textile 1. In addition, a resin adhesive layer 4 is located on the top surface of the first coating layer 2 and the top surface of the second coating layer 3 extending longer than the length of the textile 1, and a film layer 5 is provided on the top surface of the resin adhesive layer 4.

The first coating layer is formed on the textile and maintains the polypropylene-based fiber configuring the textile in a woven form to maintain a uniform interval between weft and warp, facilitate easy and precise work when cutting the textile into a desired size, and ensure solid crosslinking between the film and the textile. A coating amount of the first coating layer per unit area of the textile may be, for example, 30 to 200 $g/m^2$, preferably 80 to 160 $g/m^2$, more preferably 90 to 120 $g/m^2$.

If the coating amount meets the above range, it is possible to ensure sufficient airtightness for the textile and prevent weight or volume of the obtained fabric from excessively increasing, which may improve folding properties and pressure resistance when the fabric is applied to a high pressure hose.

The second coating layer is introduced to a surface of the textile on which the first coating layer is not formed, among both surfaces of the textile. At this time, even though the first coating layer is formed to correspond to the length of the textile, the second coating layer is formed by over-coating to extend longer than the length of the textile so as to have margins at both ends of the textile. The coating amount of the second coating layer per unit area of the textile is not strictly limited as long as the airtightness of the textile may be sufficiently ensured, but it may be, for example, 30 to 200 g/m$^2$, preferably 50 to 200 g/m$^2$, more preferably 65 to 200 g/m$^2$. This coating amount may ensure sufficient airtightness for the textile and prevent weight or volume of the obtained fabric from excessively increasing, which may improve folding properties and pressure resistance when the fabric is applied to a high pressure hose.

In addition, the film layer is formed on the top surface of the first coating layer to correspond to the length of the second coating layer, and both ends of the second coating layer and the film layer, which extend longer than the length of the textile to face each other, are adhered with a resin by means of thermal bonding or the like.

At this time, the resin adhesive layer is interposed between the first coating layer and the film layer. If the coating layer is formed thickly only with the film layer without using the resin adhesive layer, excessive degradation may be applied. Therefore, the resin adhesive layer is interposed between the first coating layer and the film layer to avoid this degradation. In other words, by introducing a process for separately forming a resin adhesive layer, it is possible to prevent degradation of the textile, caused when a coating layer having a thickness as great as the sum of the first coating layer and the film layer is formed. In order to introduce the above process for reducing resin degradation, the film layer is prepared with a previously shaped film of predetermined thickness, different from the first coating layer, and is adhered to and laminated on the first coating layer. However, since the film layer is not adhered to a cooled first coating layer, it is substantially impossible to laminate the film layer on the first coating layer with sufficient adhesive force. Therefore, in order to firmly adhere the first coating layer to the film layer, a prepared film layer should be laminated and pressed for adhesion while applying a resin having the same composition as the first coating layer between both layers by using an extruder or allowing a melted resin to flow down thereto. In other words, in order to sufficiently adhere the first coating layer and the film layer of the present disclosure, also in order to maintain surface smoothness while preventing degradation by heat when making a fabric with a thickness as great as the present disclosure, a resin adhesive layer similar or substantially identical to the first coating layer is formed between the first coating layer and the film layer. The coating amount of the resin adhesive layer is preferably in the same range as in the first coating layer.

Since end portions of the textile are not perfectly coated, when the fabric is applied to a high pressure hose, gas or liquid such as water may leak due to osmotic pressure through pores between fibers at an end of the textile. To solve this problem, in the present disclosure, the second coating layer, the resin adhesive layer and the film layer are respectively over-coated longer than the length of the textile as described above to give margins at both ends of the second coating layer, the resin adhesive layer and the film layer, and then these three layers are thermally bonded. In other words, the second coating layer, the resin adhesive layer and the film layer extend longer than the length of the textile to cover both ends of the textile and are then thermally bonded to one another, which perfectly closes pores at the ends of the textile and thus securely solves a leakage problem when the fabric is applied to a high pressure hose.

In addition, as in the eco-friendly high pressure hose fabric according to an embodiment of the present disclosure, a film may be made separately from the coating layer and then laminated to form a film layer. If the film layer is formed in this way, it is possible to maintain properties of the textile by preventing degradation of the textile and improve surface smoothness, and resultantly the quality of the fabric, by giving less heat history to the generated fabric, in comparison to the case in which a coating layer having thickness corresponding to the film layer like the first coating layer or second coating layer is additionally formed. In other words, since a separate shaped film is introduced as a film layer, it is possible to close both ends of the hose fabric, prevent the ends from being damaged while the hose is being processed, and also prevent water from penetrating into the ends of the fabric even at high pressure. If the corresponding thickness of the film layer is accomplished only with a coating layer of a melt obtained by extrusion or melting as in the case of other coating layers, the properties of the fabric may be greatly damaged and lost due to degradation. The film layer is introduced to prevent this phenomenon.

In addition, in order to allow the hose fabric to ensure high water pressure (up to 7 to 12 bar), the coating layer may have weight of at least 300 to 320 g/m$^2$. However, if this weight is accomplished only with the coating layer, the properties of the fabric may be seriously damaged due to degradation. Therefore, in order to prevent this phenomenon and improve rupture strength by contributing to the increase of weight of the coating layer, the film layer is introduced.

The weight of the film layer per unit area of the textile may be, for example, 30 to 200 g/m$^2$, preferably 80 to 150 g/m$^2$, more preferably 90 to 150 g/m$^2$. If the weight of the film layer meets the above range, it is possible to ensure sufficient airtightness for the textile and prevent weight or volume of the obtained fabric from excessively increasing. Therefore, when the fabric is applied to a high pressure hose, it is possible to improve folding properties and pressure resistance and facilitate easier storage and transfer.

In the present disclosure, as shown in FIG. 1, the ends of the second coating layer 3, the resin adhesive layer 4 and the film layer 5, which extend longer than the length of the textile, are laminated on one another and integrated to form an extended portion.

In the present disclosure, the thickness (t) of the extended portion may be suitably adjusted in consideration of pressure or the like during a pumping process. The extended portion may have thickness of, for example, 180 μm or above, preferably 180 μm to 400 μm. If the extended portion has the above thickness, it is possible to solve a water leak problem which may occur at high pressure when the fabric is applied to a hose, without any excessive cost burden. In other words, if the extended portion has the above thickness, when the hose is processed by means of thermal deposition or resin deposition, it is possible to prevent the extended portion from being damaged by heat. Therefore, water cannot penetrate into the ends of the fabric, thereby perfectly solving a water leak problem. In addition, the length (e) of the extended portion is not specially limited. But the extended portion preferably has a length capable of preventing water from penetrating into the ends of the fabric even at high pressure when the fabric is applied to a high pressure hose. For example, the extended portion may have a length of 3 mm or above, preferably 3 to 10 mm.

In the present disclosure, the polyolefin-based rubber, the polyolefin-based complex composition and the polyolefin-based resin composition may further include ultraviolet absorber, antioxidant, carbon black or the like. These additives may be included by a content of 0.1 to 10 parts by weight, preferably 0.5 to 5 parts by weight, based on 100 parts by weight of the polyolefin-based rubber, the polyolefin-based complex composition or the polyolefin-based resin composition.

Hereinafter, a method for manufacturing an eco-friendly high pressure hose fabric according to an embodiment of the present disclosure will be described. For convenience, it is assumed that the first coating layer, the second coating layer, the resin adhesive layer and the film layer all adopt the polyolefin-based complex composition.

First, a textile woven from a polypropylene-based fiber is prepared, and the top surface of the textile is coated with a polyolefin-based complex composition by melting or melt-extruding to form a first coating layer. After that, the textile is arranged so that a surface thereof on which the first coating layer is not formed faces upwards, and a second coating layer is formed on the other surface of the textile in the same way. At this time, the second coating layer is formed so that both ends thereof in the length direction extend longer than the ends of the textile and thus have margins. At this time, before forming the second coating layer, the textile may be cut to have a length suitable as a final product. Next, the textile is arranged again so that the surface thereof on which the first coating layer is formed faces the top surface, and the top surface of the first coating layer is coated with a resin adhesive layer by melting or melt-extruding to form a resin adhesive layer. During this process, a polyolefin-based film, which has been already prepared by molding, is laminated on the top surface of the resin adhesive layer and adhered thereto to form a film layer. The film of the film layer is formed to correspond to the length and width of the second coating layer. Finally, the first coating layer, the second coating layer, the resin adhesive layer and the film layer formed on the upper and lower surfaces of the textile are firmly bonded while passing between thermal compressing rollers, thereby manufacturing a high pressure hose fabric. In particular, both ends of the second coating layer and the film layer of the fabric are thermally bonded sufficiently in order to prevent liquid or the like from leaking through the ends when the fabric is applied to a hose.

When extrusion-molding the coating layer, if a distance from the textile to a lip of a T-die where an extrudate flows down is long, the high-temperature extrudate may be cooled in the art, which may greatly deteriorate the coating bonding force. Therefore, the distance between the textile and the lip of the T-die is 15 cm or less, preferably 6 to 12 cm, more preferably about 8 to 8.5 cm.

In the hose fabric manufactured according to the present disclosure, the coating adhesion between the textile and the first and second coating layers is 80 to 120 N/5 cm, more preferably 95 to 105 N/5 cm, based on the test method BS 3424 part 7 method 9B. Therefore, it is possible to ensure high water pressure when the hose fabric is applied to a hose, and the fabric may be used for a long time as a high pressure hose.

According to an embodiment of the present disclosure, there is provided an eco-friendly high pressure hose in which both ends of the eco-friendly high pressure hose fabric as described above overlap each other.

Referring to FIG. 2, first there is provided a fabric, which includes a first coating layer 2 and a second coating layer 3 respectively formed on one surface and the other surface of the textile 1, a resin adhesive layer 4 formed on the top surface of the first coating layer 2 and the top surface of the second coating layer 3 extending longer than the length of the textile 1, and a film layer 5 provided on the resin adhesive layer. Here, the fabric is rolled into a cylindrical shape so that both ends of the fabric partially overlap each other, and the overlapping portion is thermally bonded, thereby manufacturing a hose. According to an embodiment of the present disclosure, the hose may be manufactured with the above hose fabric at preferably 400 to 600° C., more preferably 500 to 600° C., with a deposition rate of 8 to 12 m/minute by using a hot air blowing depositing machine.

Advantageous Effects

According to an embodiment of the present disclosure, it is possible to provide an eco-friendly high pressure hose fabric, which generates smaller ash at incineration in comparison to existing PVC material, does not generate toxic gas, allows easier incineration or recycling by melting, facilitates easier handling by reducing weight, and ensures excellent durability when a high water pressure is applied thereto, and a high pressure hose using the fabric.

Reference Symbols

Figure 1:
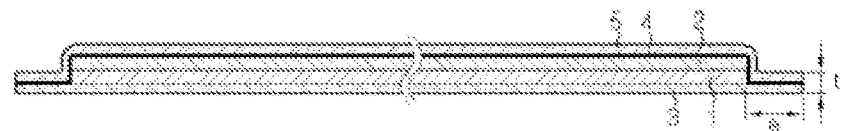
FIG. 1 is a schematic view showing an eco-friendly high pressure hose fabric according to an embodiment of the present disclosure.
Figure 2:
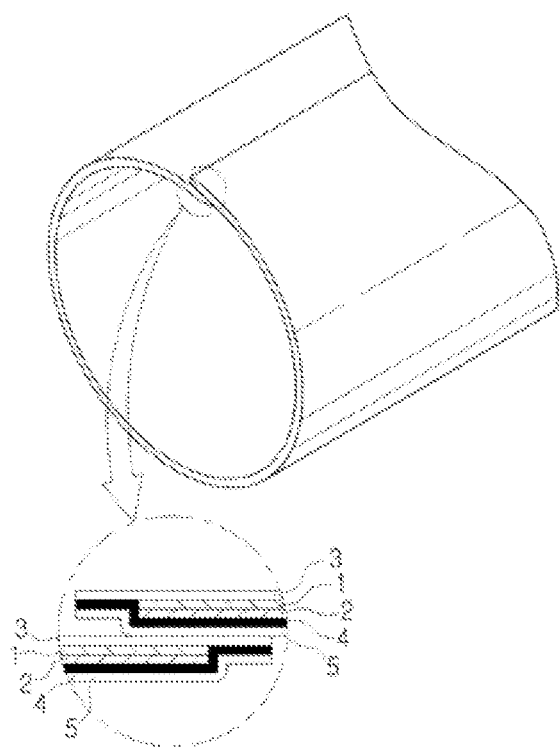
FIG. 2 is a schematic view showing an eco-friendly high pressure hose according to an embodiment of the present disclosure.

1: textile, 2: first coating layer, 3: second coating layer, 4: resin adhesive layer, 5: film layer

BEST MODE

Hereinafter, embodiments the present disclosure will be described in detail. However, the embodiments of the present disclosure may be modified in various ways, and the scope of the present disclosure should not be interpreted as being limited to the following embodiments. The embodiments of the present disclosure are given for better understanding to those skilled in the art.

Example 1

A textile woven from a polypropylene fiber having strength of 7.2 to 7.8 g/De and fineness of 1,000 De was prepared to have a warp density of 20 pick/inch and a weft density of 22 pick/inch. A polyolefin-based complex composition, in which 25 parts by weight of polypropylene DL-270A, produced by Honam Petrochemical Corp. and serving as a polyolefin-based resin, and 75 parts by weight of Adflex CA60A, produced by Basell and serving as a polyolefin-based rubber, were mixed, was applied to coat one surface of the textile by using an extrusion-coating machine, thereby forming a first coating layer. The coating condition had a T-die temperature of 265 to 270° C., a coating speed of 17 m/minute, and a discharge amount of 100 g/m². In addition, the first coating layer had thickness of 109.9 μm.

Next, the polyolefin-based complex composition, in which 25 parts by weight of polypropylene 270A, produced by Honam Petrochemical Corp. and serving as a polyolefin-based resin, and 75 parts by weight of Adflex CA60A, produced by Basell and serving as a polyolefin-based rubber, were mixed, was applied to coat the other surface of the textile by using an extrusion-coating machine, thereby forming a second coating layer. The coating condition had a T-die temperature of 265 to 270° C., a coating speed of 17 m/minute, and a discharge amount of 100 g/m². In addition, the second coating layer extended at both ends by 7 mm longer than the length of the textile to have margins, and the second coating layer had thickness of 109.9 μm.

After that, the polyolefin-based complex composition, in which 25 parts by weight of polypropylene 270A, produced by Honam Petrochemical Corp. and serving as a polyolefin-based resin, and 75 parts by weight of Adflex CA60A produced by Basell and serving as a polyolefin-based rubber, were mixed, was applied to coat the first coating layer by using an extrusion-coating machine, thereby forming a resin adhesive layer. The coating condition had a T-die temperature of 265 to 270° C., a coating speed 17 m/minute, and a discharge amount of 70 g/m². In addition, the resin adhesive layer had thickness of about 76.9 μm.

Next, a film having three layers prepared by a blown process was thermally bonded onto the resin adhesive layer and cooled in the air to form a film having thickness of 100 μm. At this time, the film layer was formed to have a length corresponding to the second coating layer. The first layer of the three-layered film was formed with a mixture resin containing 80% of FI150, produced by Honam Petrochemical Corp., and 20% of Q100F, produced by Basell. The second layer was formed with a mixture resin containing 80% of Q100F, produced by Basell, and 20% of FI150, produced by Honam Petrochemical Corp. The third film was formed with a mixture resin containing 80% of FI150, produced by Honam Petrochemical Corp., and 20% of Q100F, produced by Basell. The entire thickness of the film was 100 μm, every layer had the same extrusion amount, and the entire weight was 90 g/m².

After that, the textile, the first coating layer, the second coating layer, the resin adhesive layer and the film layer were allowed to pass through cooling rollers having a surface temperature of about 22° C. to be integrated, thereby manufacturing a high pressure hose fabric. At this time, the extended portion of the high pressure hose fabric had thickness of 286.8 μm and a length of 7 mm.

Next, the fabric prepared as above to have a fabric width of 36 cm was molded by a hot air blower at 530° C. with a deposition rate of 10.5 m/minute, thereby manufacturing a high pressure hose having a diameter of 10.16 cm. At this time, the fabric was wound and then deposited using a hot air blower so that both ends of the fabric overlapped each other by about 3.5 cm.

Example 2

A high pressure hose fabric was manufactured in the same way as Example 1, except that a textile woven to have a warp density of 18 pick/inch and a weft density of 18 pick/inch, made from a polypropylene fiber having strength of 8.0 to 8.5 g/De and fineness of 1,500 De, was used. In addition, the fabric prepared as above to have a fabric width of 36 cm was molded by a hot air blower at 530° C. with a deposition rate of 10.5 m/minute, thereby manufacturing a high pressure hose having a diameter of 10.16 cm. At this time, the fabric was wound and then deposited using a hot air blower so that both ends of the fabric overlapped each other by about 3.5 cm.

Comparative Example 1

A textile woven from a polypropylene fiber having strength of 7.2 to 7.8 g/De and fineness of 1,000 De was prepared to have a warp density of 20 pick/inch and a weft density of 22 pick/inch. A polyolefin-based complex composition, in which 25 parts by weight of polypropylene 270A, produced by Honam Petrochemical Corp. and serving as a polyolefin-based resin, and 75 parts by weight of CA60A, produced by Basell and serving as a polyolefin-based rubber, were mixed, was applied to coat one surface of the textile by using an extrusion-coating machine, thereby forming a first coating layer. The coating condition had a T-die temperature of 265 to 270° C., a coating speed of 17 m/minute, and a discharge amount of 70 g/m². In addition, the first coating layer had thickness of 76.9 μm.

Next, the polyolefin-based complex composition, in which 25 parts by weight of polypropylene 270A, produced by Honam Petrochemical Corp. and serving as a polyolefin-based resin, and 75 parts by weight of CA60A grade, produced by Basell and serving as a polyolefin-based rubber, were mixed, was applied to coat the other surface of the textile by using an extrusion-coating machine, thereby forming a second coating layer. The coating condition had a T-die temperature of 265 to 270° C., a coating speed of 17 m/minute, and a discharge amount of 85 g/m². In addition, the second coating layer extended at both ends by 7 mm longer than the length of the textile to have margins, and the second coating layer had thickness of 93.4 μm.

After that, the polyolefin-based complex composition, in which 25 parts by weight of polypropylene 270A, produced by Honam Petrochemical Corp. and serving as a polyolefin-based resin, and 75 parts by weight of CA60A grade, produced by Basell and serving as a polyolefin-based rubber, were mixed, was applied to coat the first coating layer by using an extrusion-coating machine, thereby forming a third coating layer. The coating condition had a T-die temperature of 265 to 270° C., a coating speed 17 m/minute, and a discharge amount of 85 g/m². In addition, the third adhesive coating had thickness of about 93.4 μm.

Next, the textile, the first coating layer, the second coating layer and the third coating layer were allowed to pass through cooling rollers having a surface temperature of about 22° C. to be integrated, thereby manufacturing a high pressure hose fabric without a film layer.

After that, the fabric prepared as above to have a fabric width of 36 cm was molded by a hot air blower at 530° C. with a deposition rate of 10.5 m/minute, thereby manufacturing a high pressure hose having a diameter of 10.16 cm. At this time, the fabric was wound and then deposited using a hot air blower so that both ends of the fabric overlapped each other by about 3.5 cm.

Comparative Example 2

A high pressure hose fabric was manufactured in the same way as Example 1, except that the first coating layer, the second coating layer and the resin adhesive layer were respectively coated with 100 wt % of DL-270A, produced by Honam Petrochemical Corp.

Comparative Example 3

A high pressure hose fabric was manufactured in the same way as Example 1, except that the first coating layer was respectively coated with 100 wt % of DL-270A, produced by Honam Petrochemical Corp.

Evaluation of Coating Adhesion of the Hose Fabric

Adhesion between the textile and the coating layers of the fabrics prepared in Example 1, Example 2, Comparative Example 1 and Comparative Example 2 was respectively measured based on BS 3424 part 7 method 9B. The measurement results are shown in Table 1 below.

TABLE 1

Evaluation of Water Leak Inner Pressure of Hose

| | Adhesion between the first coating layer and the textile (N/5 cm) | Adhesion between the second coating layer and the textile (N/5 cm) |
|---|---|---|
| Example 1 | 95 | 98.1 |
| Example 2 | 100 | 103.5 |
| Comparative Example 1 | 91 | 95 |
| Comparative Example 2 | 17 | 18.3 |
| Comparative Example 3 | 18 | 97 |

Evaluation of Water Leak of the Hose Against Internal Pressure

The hoses manufactured in Examples 1 and 2 and Comparative Examples 1 and 2 were respectively cut to have a length of about 60 cm to 80 cm, and both ends thereof were put into a steel hose rotary joint and firmly fixed using a steel band as a rivet so that water cannot leak at all. After that, water was continuously injected into the hose to test water pressure. The high pressure hoses prepared in Examples 1 and 2 according to the present disclosure did not cause water leak under a pressure of 7 to 8.5 bar and thus endured high pressure. However, the hoses prepared in Comparative Examples 1 to 3 caused water leak under a pressure of 2 bar or below and could not have high-pressure performance.

What is claimed is:

1. An eco-friendly high pressure hose fabric, comprising:
a textile woven from a polypropylene-based fiber;
a first coating layer formed on one surface of the textile;
a second coating layer formed on the other surface of the textile to extend longer than the length of the textile;
a resin adhesive layer formed over the entirety of the top surface of the first coating layer and the top surface of the second coating layer extending longer than the length of the textile; and
a film layer formed on the top surface of the resin adhesive layer to correspond to the length of the second coating layer,
wherein ends of the second coating layer, the resin adhesive layer and the film layer, which extend longer than the length of the textile and are stacked on one another, form an extended portion of the fabric,
wherein the first coating layer, the second coating layer and the resin adhesive layer are independently made of a polyolefin-based rubber or a polyolefin-based complex composition, respectively, and
wherein the film layer is made of a polyolefin-based rubber, a polyolefin-based complex composition or a polyolefin-based resin composition.

2. The eco-friendly high pressure hose fabric according to claim 1,
wherein the extended portion has a thickness of 180 to 400 μm.

3. The eco-friendly high pressure hose fabric according to claim 1,
wherein the polyolefin-based rubber is a resin having a rubber component formed as a domain in a polyolefin-based resin matrix.

4. The eco-friendly high pressure hose fabric according to claim 1,
wherein the polyolefin-based complex composition is a mixture of the polyolefin-based rubber and the polyolefin-based resin.

5. The eco-friendly high pressure hose fabric according to claim 1,
wherein the polyolefin resin contains 50 to 99.99 weight % of ethylene or propylene and is selected from copolymers of ethylene or propylene and at least one monomer selected from alpha olefin of $C_2$ to $C_{16}$, (meth)acrylic acid, (meth)acrylate, vinyl acetate and styrene, and their mixtures.

6. The eco-friendly high pressure hose fabric according to claim 1,
wherein a coating adhesion between the textile and the first and second coating layers are independently 95 to 105 N/5 cm, based on BS 3424 part 7 method 9B.

7. The eco-friendly high pressure hose fabric according to claim 6,
wherein the textile is made of a polyolefin fiber having strength of 5 g/De to 9 g/De.

8. An eco-friendly high pressure hose, which is formed by overlapping both ends of the fabric defined in claim 1.

9. The eco-friendly high pressure hose according to claim 8, wherein the first coating layer, the second coating layer, the resin adhesive layer and the film layer of the eco-friendly high pressure hose respectively have coating amounts of 30 to 200 g/m².

* * * * *